Dec. 1, 1953     G. T. LYON     2,661,225
HOSE CLAMP FITTING CONNECTION
Filed Jan. 14, 1950
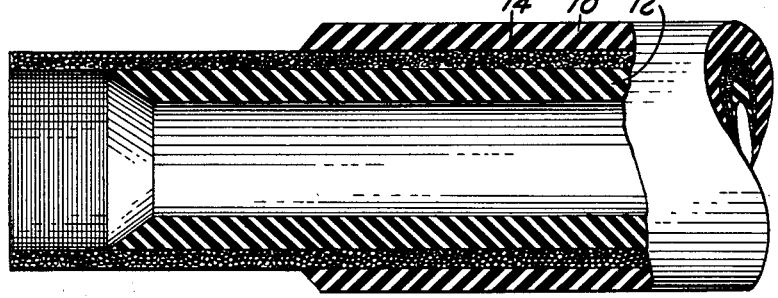
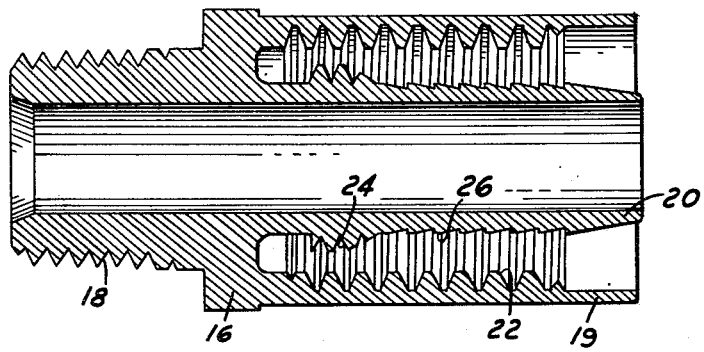
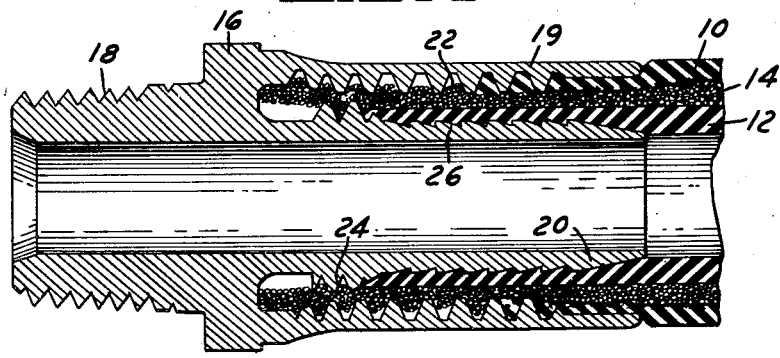
INVENTOR.
GILBERT T. LYON
BY
Burton & Parker
ATTORNEYS

Patented Dec. 1, 1953

2,661,225

UNITED STATES PATENT OFFICE 2,661,225

HOSE CLAMP FITTING CONNECTION

Gilbert T. Lyon, Van Dyke, Mich.

Application January 14, 1950, Serial No. 138,594

4 Claims. (Cl. 285—84)

This invention relates to improvements in a hose clamp fitting connection and particularly to such a connection designed for high pressure use.

An object is to provide an improved connection between a hose clamp fitting and a hose designed to maintain high pressures without leakage.

Another object is to provide a hose connection with a hose clamp fitting whereby the hose is held securely by the clamp against loosening therefrom and is held in such a manner as to prevent leakage under high pressure within the hose connection.

High pressure hose commonly comprises a hose structure having an inner rubber layer, an outer rubber layer, and a reinforcing metallic layer disposed between the inner and outer layers and integrally associated therewith. The hose fitting or clamp used with such a hose commonly comprises a tubular body threaded internally or externally at one end to be coupled with a suitable cooperating fitting and adapted at the opposite end to be secured at the end of a hose. Such opposite end commonly comprises a tubular shell and a tubular nipple disposed axially within the shell spaced therefrom to receive the end of a hose to be secured thereto within the shell and over the nipple. The shell is then contracted about the hose securing the fitting to the hose.

One difficulty which has heretofore attended the use of a hose connection of this type has been to provide a joint between the hose and the fitting which joint is sufficiently tight as to prevent fluid leakage under hard pressures within the connection and also is sufficiently secure to fasten the hose to the fitting in such a manner as to prevent loosening therefrom.

A meritorious feature of this invention is that the end of the fitting which is secured to the hose is so constructed and is so engaged with the hose and the hose itself is so prepared for engagement with the fitting that the fitting is provided with means which engages the hose through all three layers thereof adjacent to the outer end of the fitting and engages the hose through the inner layer and the reinforcing metal layer at a point spaced inwardly from the end of the fitting and also engages the reinforcing metallic layer directly adjacent to the inner end of the fitting. The engagement of the fitting with the hose through the several layers jointly and individually is such that the hose is held securely against release and against fluid leakage.

The inner surface of the shell portion of the fitting which receives the hose and the outer surface of the nipple portion of the fitting which is received within the hose are provided with cooperating hose engaging protuberances of such a character that not only are the several layers of the hose engaged together but individual layers and particularly the interior reinforcing metal layer is engaged directly so as to form a secure connection between the hose and the fitting.

Other objects, advantages and meritorious features will appear from the following description, claims and drawing, wherein:

Fig. 1 is a fragmentary elevation partly in section illustrating a hose prepared to be secured to the fitting;

Fig. 2 is a longitudinal sectional view through the fitting which is adapted to be secured to the hose; and Fig. 3 is a longitudinal sectional view through the hose connection including the fitting and the hose to which the fitting is attached.

As hereinabove stated high pressure fluid delivery hose commonly includes an outer rubber layer 10, an inner rubber layer 12, and a reinforcing metal layer 14 which is commonly made up of metal wire disposed between the inner and outer layers and integrally embedded therebetween. In order to prepare this hose to be secured to a fitting to provide the connection herein described, the outer layer is stripped back or cut away from the reinforcing layer as shown in Fig. 1 of the drawing. Such outer layer 10 is cut away extending inwardly from an end of the hose so as to expose the wire reinforcing layer as illustrated in Fig. 1 of the drawing. The inner layer 12 extending inwardly from an end of the hose is also stripped back or cut away from the wire reinforcing layer so as to expose such metal reinforcement. The inner layer, however, is cut back a distance less than that of the outer layer, all as illustrated in Fig. 1.

The hose clamp or fitting shown in Fig. 2 is illustrated as comprising a tubular body member 16 externally threaded at one end as at 18 to be coupled with a cooperating fitting. The opposite end of this tubular body member comprises a shell portion 19 and a nipple portion 20, which latter is flared at its open end. The nipple portion is disposed axially within the shell spaced radially therefrom. The inner surface of the shell is provided with a series of ridges or circumferential protuberances 22. The outer surface of the nipple is provided with a series of circumferential ridges or protuberances 24 which are shown as of approximately the same height as the ridges 22. The outer surface of the nipple is also provided with a series of ridges or protuberances 26 which project outwardly to a height substantially less than that of the ridges 24. The ridges 22 of the shell are spaced substantially closer to the ridges 24 of the nipple than to the ridges 26 thereof as shown in Fig. 2 of the drawing and the ridges 24 are sharper and deeper than ridges 26 for a purpose that will appear hereinafter.

The end of the hose which has been prepared to be received within the fitting is inserted within the shell of the fitting surrounding the nipple and the shell is contracted thereabout by a swaging operation so that the ridges 22 grip the hose and hold it tightly against the ridges on the outer surface of the nipple. The ridges 24 on the nipple cooperate with the oppositely disposed ridges 22 of the shell to grip the metal reinforcing layer 14 of the hose directly as shown in Fig. 3. The ridges 26 of the nipple cooperate with the ridges 22 to grip the hose through the inner layer 12 and the reinforcing layer 14 for a portion of the distance outwardly beyond where the hose is gripped directly through the reinforcing layer. Adjacent to the outer end of the fitting the hose is gripped through both the inner and outer layers and the reinforcing layer.

Due to the manner in which the hose is gripped by the fitting as hereinabove set forth a particularly tight joint is formed therewith and the connection is a secure one and offers a very high degree of resistance to leakage or loosening.

What I claim is:

1. In combination, a coupling body in the form of a rigid unit having a tubular shell and a tubular nipple disposed axially within the shell spaced radially therefrom, opposed surfaces of the shell and nipple provided throughout that portion of their axial length from adjacent to the inner end of the shell to a point spaced from the outer end thereof with opposed cooperating gripping protuberances, said opposed protuberances approaching substantially more closely to each other adjacent to the inner end of the shell than adjacent to the outer end thereof, a hose having a reinforcing metal core layer and inner and outer non-metallic layers secured to the core layer and stripped therefrom from one end of the hose for a portion of the length of the hose less than the axial extent of the opposed protuberances of the shell and nipple, said metal core layer having the outer non-metallic layer stripped therefrom throughout a greater axial length than the inner non-metallic layer is stripped therefrom to thereby form terminal, intermediate, and normal sections, said end of the hose received over the nipple within the shell, said shell contracted about the hose gripping the hose between the shell and the nipple and gripping the same directly upon both sides of the terminal metal layer section adjacent to the inner end of the shell and gripping the hose directly upon the non-metallic inner and outer layers along the normal section adjacent to the outer end of the shell and gripping the hose directly upon the exposed metal layer on the outside and upon the inner non-metallic layer on the inside throughout the intermediate section lying between the ends of the shell and nipple, the terminal and intermediate hose section-engaging portions of said shell and nipple each comprising a plurality of said cooperating protuberances.

2. In combination, a coupling body in the form of a rigid unit having a tubular shell and a tubular nipple disposed axially within the shell spaced radially therefrom, opposed surfaces of the shell and nipple provided throughout that portion of their axial length from adjacent to the inner end of the shell to a point spaced from the outer end thereof with opposed cooperating gripping protuberances, said opposed protuberances approaching substantially more closely to each other and being sharper and deeper adjacent to the inner end of the shell than adjacent to the outer end thereof, a hose having a reinforcing metal core layer and inner and outer non-metallic layers secured to the core layer and stripped therefrom from one end of the hose for a portion of the length of the hose less than the axial extent of the opposed protuberances of the shell and nipple, said metal core layer having the outer non-metallic layer stripped therefrom throughout a greater axial length than the inner non-metallic layer is stripped therefrom to thereby form terminal, intermediate, and normal sections, said end of the hose received over the nipple within the shell, said shell contracted about the hose gripping the hose between the shell and the nipple and gripping the same directly upon both sides of the terminal metal layer section adjacent to the inner end of the shell and gripping the hose directly upon the exposed metal layer on the outside and upon the inner non-metallic layer on the inside throughout the intermediate section lying between the ends of the shell and nipple, the terminal and intermediate hose section-engaging portions of said shell and nipple each comprising a plurality of said cooperating protuberances at least one pair of which engage said terminal section.

3. In combination, a coupling body in the form of a rigid unit having a tubular shell and a tubular nipple disposed axially within the shell spaced radially therefrom, opposed surfaces of the shell and nipple provided throughout that portion of their axial length from adjacent to the inner end of the shell to a point spaced from the outer end thereof with opposed cooperating gripping protuberances, said opposed protuberances approaching substantially more closely to each other adjacent to the inner end of the shell than adjacent to the outer end thereof, a hose having a reinforcing metal core layer and inner and outer non-metallic layers secured to the core layer and stripped therefrom from one end of the hose for a portion of the length of the hose less than the axial extent of the opposed protuberances of the shell and nipple, said metal core layer having the outer non-metallic layer stripped therefrom throughout a greater axial length than the inner non-metallic layer is stripped therefrom to thereby form terminal, intermediate, and normal sections, said end of the hose received over the nipple within the shell, said shell contracted about the hose gripping the hose between the shell and the nipple and gripping the same directly upon both sides of the terminal metal layer section adjacent to the inner end of the shell and gripping the hose directly upon the non-metallic inner and outer layers along the normal section adjacent to the outer end of the shell and gripping the hose directly upon the exposed metal layer on the outside and upon the inner non-metallic layer on the inside throughout the intermediate section lying between the ends of the shell and nipple, the terminal and intermediate hose section-engaging portions of said shell and nipple each comprising a plurality of said cooperating protuberances, the wall formed by the nipple and the shell being flared outwardly along the space beyond the end of the protuberances.

4. In combination, a coupling body in the form of a rigid unit having a tubular shell and a tubular nipple disposed axially within the shell spaced radially therefrom, opposed surfaces of the shell and nipple provided throughout that portion of their axial length from adjacent to the inner end of the shell to a point spaced from the outer end thereof with opposed cooperating gripping protuberances, said opposed protuberances approaching substantially more closely to each other and being sharper and deeper adjacent to the inner end of the shell than adjacent to the outer end thereof, a hose having a reinforcing metal core layer and inner and outer non-metallic layers secured to the core layer and stripped therefrom from one end of the hose for a portion of the length of the hose less than the axial extent of the opposed protuberances of the shell and nipple, said metal core layer having the outer non-metallic layer stripped therefrom throughout a greater axial length than the inner non-metallic layer is stripped therefrom to thereby form terminal, intermediate, and normal sections, said end of the hose received over the nipple within the shell, said shell contracted about the hose gripping the hose between the shell and the nipple and gripping the same directly upon both sides of the terminal metal layer section adjacent to the inner end of the shell and gripping the hose directly upon the non-metallic inner and outer layers along the normal section adjacent to the outer end of the shell and gripping the hose directly upon the exposed metal layer on the outside and upon the inner non-metallic layer on the inside throughout the intermediate section lying between the ends of the shell and nipple, the terminal and intermediate hose section-engaging portions of said shell and nipple each comprising a plurality of said cooperating protuberances, at least one pair of which engage said terminal section, the wall formed by the nipple and the shell being flared outwardly along the space beyond the end of the protuberances.

GILBERT T. LYON.

References Cited in the file of this patent

UNITED STATES PATENTS

| Number | Name | Date |
|---|---|---|
| Re. 20,629 | Eisenman | Jan. 18, 1938 |
| 2,288,684 | Couty | July 7, 1942 |
| 2,384,635 | Melsom | Sept. 11, 1945 |
| 2,550,583 | Millar | Apr. 24, 1951 |